United States Patent
Sun et al.

(10) Patent No.: US 8,139,936 B2
(45) Date of Patent: Mar. 20, 2012

(54) METHOD AND APPARATUS OF ROUTING CONVERGENCE IN CONTROL PLANE OF AN INTELLIGENT OPTICAL NETWORK

(75) Inventors: Junbai Sun, Shenzhen (CN); Xinghua Shi, Shenzhen (CN); Zihao Zhou, Shenzhen (CN); Chunhui Chen, Shenzhen (CN); Xiaowei Zhang, Shenzhen (CN); Yu Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 980 days.

(21) Appl. No.: 11/697,136

(22) Filed: Apr. 5, 2007

(65) Prior Publication Data

US 2008/0019688 A1 Jan. 24, 2008

(30) Foreign Application Priority Data

Jul. 18, 2006 (CN) .......................... 2006 1 0103318

(51) Int. Cl.
*G02F 1/00* (2006.01)

(52) U.S. Cl. ......... 398/2; 398/5; 398/7; 398/17; 398/33; 398/34; 398/22; 398/23; 398/79; 398/30; 398/31; 370/351; 370/400; 370/466; 370/223; 370/228

(58) Field of Classification Search .................. 398/2, 3, 398/5, 7, 8, 17, 30, 31, 33, 57, 58, 59, 79, 398/45, 54, 52, 48, 50, 10, 49, 4, 56, 22, 398/23, 24, 34, 135, 136, 154, 155, 164, 398/182, 183, 202, 208, 214; 370/351, 400, 370/225, 242, 352, 389, 466, 222, 223, 228, 370/370/392, 397, 216, 217, 218, 241

See application file for complete search history.

(56) References Cited

U.S. PATENT DOCUMENTS

| 7,190,896 B1 * | 3/2007 | Wang et al. ...................... 398/30 |
| 7,548,510 B2 * | 6/2009 | Kim et al. ....................... 370/225 |
| 2002/0171886 A1 * | 11/2002 | Wu et al. ........................ 359/110 |
| 2003/0189920 A1 * | 10/2003 | Erami et al. ................... 370/351 |

(Continued)

FOREIGN PATENT DOCUMENTS

CN 1527507 A 9/2004

(Continued)

OTHER PUBLICATIONS

European Search Report for Application No. 07105276.5-2415, dated Jul. 7, 2007.
First Office Action for Chinese Application No. 200610103318.8 dated Jul. 11, 2008.

*Primary Examiner* — Hanh Phan
(74) *Attorney, Agent, or Firm* — Conley Rose, P.C.; Grant Rodolph

(57) ABSTRACT

The embodiments of the invention provide a method of routing convergence in a control plane of an intelligent optical network, which includes: a function unit perceiving a service link state transmitting an alarm notification message indicating a failure in a service link to a routing protocol unit when the service link is in failure; the routing protocol unit confirming a service link failure in the control plane according to the alarm notification message. The embodiments of the invention also provide an apparatus of routing convergence in a control plane of an intelligent optical network. According to the embodiments of the invention, the establishment of a new service or re-routing may be implemented within several seconds or even hundreds of milliseconds after the service link failure in the control plane occurs.

10 Claims, 5 Drawing Sheets

U.S. PATENT DOCUMENTS

| | | | |
|---|---|---|---|
| 2004/0109687 A1* | 6/2004 | Park et al. | 398/57 |
| 2005/0122908 A1* | 6/2005 | Soumiya et al. | 370/241 |
| 2006/0072471 A1* | 4/2006 | Shiozawa | 370/248 |
| 2006/0114818 A1* | 6/2006 | Canali et al. | 370/216 |
| 2008/0019688 A1 | 1/2008 | Sun et al. | |

FOREIGN PATENT DOCUMENTS

| | | |
|---|---|---|
| CN | 1878036 A | 12/2006 |
| EP | 1 152 631 | 11/2001 |
| WO | 02/071690 | 9/2002 |

* cited by examiner

METHOD AND APPARATUS OF ROUTING CONVERGENCE IN CONTROL PLANE OF AN INTELLIGENT OPTICAL NETWORK

CROSS-REFERENCE TO RELATED APPLICATION

The priority benefit of Chinese Patent Application No. 200610103318.8 filed Jul. 18, 2006, the entire disclosure of which is hereby incorporated herein by reference, is claimed.

BACKGROUND OF THE INVENTION

1. Field of the Invention

The invention relates to intelligent optical network techniques, and more particularly, to a method and an apparatus of routing convergence in the control plane of an intelligent optical network.

2. Background of the Invention

Along with the rapid development of communication techniques and sharp increase of data service transmission, the intelligent optical network has become a new important communication technique and been widely used due to its features such as dynamic allocation of network resources, transmission of high data volume and high performance-price ratio. In the intelligent optical network, link resources are crucial to a service establishment. The link resources in the intelligent optical network include link resources in the transport plane for bearing service data, and link resources in the control plane for transmitting service signaling messages.

In the intelligent optical network, the routing protocol is a very important intelligent protocol. In the routing protocol, the Internet Protocol (IP) serves as a network layer protocol and functions to flood the information of link resources in the transport plane, perceive the state of link resources in the control plane, and calculate a routing forward table in the control plane to provide a basis for forwarding signaling messages by the network layer.

In the related art, the routing protocol perceives the state change of link resources in the control plane, that is to say, routing convergence is implemented by a source node receiving a routing protocol message. For example, a link in the control plane is deemed as interrupted if the source node has not received a routing protocol message indicating that the service processing is normal within a period of time which is generally 40 s.

FIG. 1 is a simplified schematic diagram illustrating a topology structure of the control plane of an intelligent optical network. In FIG. 1, Node A 101 is connected to Node B 102 through optical fiber link 111 and optical fiber link 112, Node B 102 is connected to Node C 103 through optical fiber link 123 and Data Communication Network (DCN) or Ethernet switch 104, wherein, Node B 102 is connected to DCN or Ethernet switch 104 through Ethernet link 124, and Node C 103 is connected to DCN or Ethernet switch 104 through Ethernet link 132. It is specified in the routing table that the routing from Node A 101 to Node C 103 is through optical fiber link 111, Ethernet link 124 and Ethernet link 132 in turn. When there is a failure in optical fiber link 111, e.g., optical fiber break, the system initiates re-routing, and an established re-routing path is through optical fiber link 112, Ethernet link 124 and Ethernet link 132. However, if there is also a failure of optical fiber break in Ethernet link 124, the state change of the link may be not perceived within a long time due to a low speed of routing convergence, as a result, re-routing may not succeed within a long period of time.

As can be seen from the above technique scheme, since the convergence speed of the conventional routing convergence method is slow, system services will not be established within a long time or the re-routing fails when there is a service link failure in the control plane of the intelligent optical network, which further influences the survivability of network services.

SUMMARY OF THE INVENTION

The embodiments of the invention provide a method and an apparatus of routing convergence in the control plane of an intelligent optical network.

A method of routing convergence in the control plane of an intelligent optical network includes:
  transmitting, by a function unit perceiving a service link state, an alarm notification message indicating a failure in a service link to a routing protocol unit when the service link is in failure;
  confirming, by the routing protocol unit, a service link failure in the control plane according to the alarm notification message.

An apparatus of routing convergence in the control plane of an intelligent optical network includes:
  a function unit perceiving a service link state, for transmitting an alarm notification message indicating a failure in a service link when the link is in failure;
  a routing protocol unit, for confirming a service link failure in the control plane according to the alarm notification message.

As can be seen from the above technical scheme, according to the method and apparatus of routing convergence in the control plane of the embodiments of the invention, in the intelligent optical network, the function unit perceiving a service link state transmits an alarm notification message indicating a failure in a service link to the routing protocol unit when the service link is in failure. The routing protocol unit confirms a service link failure in the control plane according to the alarm notification message. The method and apparatus thus may implement the establishment of a new service or rerouting within several seconds or even hundreds of milliseconds after the service link in the control plane of the intelligent optical network is in failure, thereby increasing the reliability of information in control plane and further increasing the survivability of network services.

DETAILED DESCRIPTION OF THE PREFERRED EMBODIMENTS

The invention is further described in detail with reference to the accompanying drawings and embodiments.

The embodiments of the invention include: a function unit perceiving a service link state in an intelligent optical network transmits an alarm notification message indicating a failure in a service link to a routing protocol unit when the service link is in failure; and the routing protocol unit confirms a service link failure in the control plane according to the alarm notification message.

The function unit perceiving the link state in the intelligent optical network may be a function unit in the transport plane or other intelligent protocol units except the routing protocol unit. The alarm notification message includes an alarm message of the function unit perceiving a service link failure in the transport plane and a notification message of other intelligent protocol units perceiving a service link failure. The common character of the alarm message and the notification message is that it takes a short time to perceive the service link failure, generally several seconds or even hundreds of milliseconds.

Figure 1:
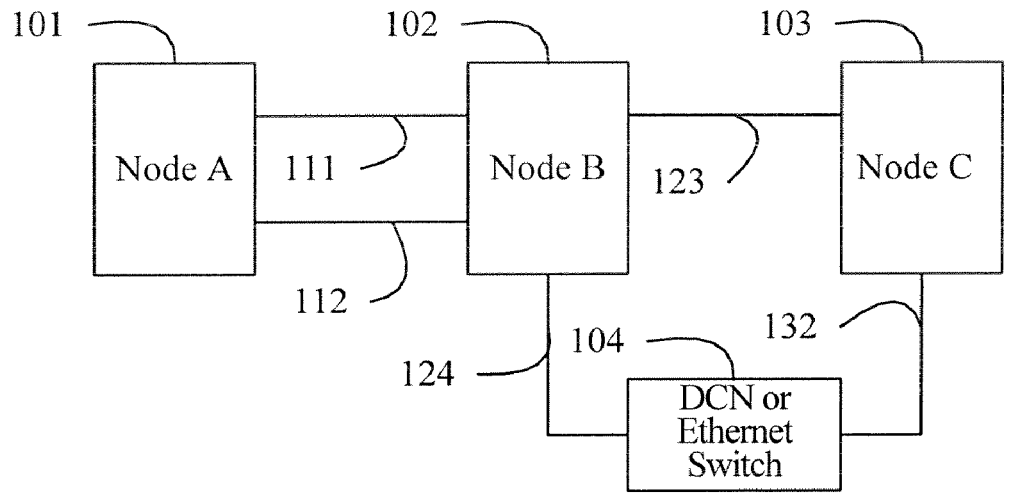
FIG. 1 is a simplified schematic diagram illustrating a topology structure of the control plane of an intelligent optical network.
Figure 2:
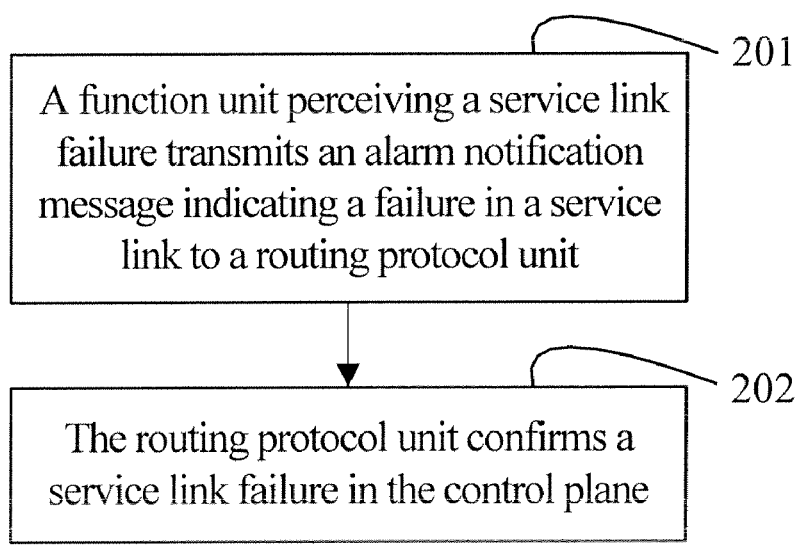
FIG. 2 is a simplified schematic flow chart illustrating a method of routing convergence in the control plane according to the embodiments of the invention.

FIG. 2 is a simplified schematic flow chart illustrating a method of routing convergence in the control plane according to embodiments of the invention. As shown in FIG. 2, the method includes the following steps.

Step 201: a function unit perceiving a service link state in the intelligent optical network transmits an alarm notification message indicating a failure in a service link to a routing protocol unit when the service link is in failure.

Step 202: the routing protocol unit confirms a service link failure in the control plane.

The technical schemes of the embodiments of the invention will be hereinafter illustrated in detail with reference to intelligent optical networks based on heterogeneous devices and different alarm notification messages.

Figure 3:
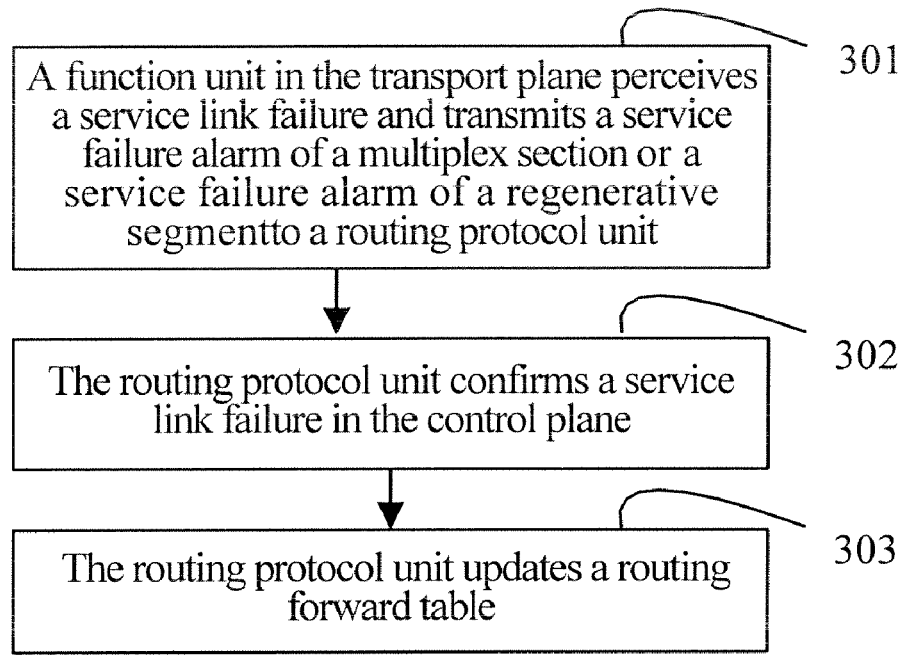
FIG. 3 is a simplified flow chart illustrating a method of routing convergence in the control plane according to an embodiment of the invention.

In an embodiment of the invention, the method of routing convergence in the control lane is implemented by an intelligent optical network based on the Synchronous Digital Hierarchy/Synchronous Optical Network (SDH/SONET). FIG. 3 is a simplified flow chart illustrating a method of routing convergence in the control plane according to the present embodiment. As shown in FIG. 3, the method includes the following steps.

Step 301: a function unit in the transport plane transmits a service failure alarm of a multiplex segment or a service failure alarm of a regenerative segment to a routing protocol unit after perceiving a service link failure in the transport plane. The function unit in this embodiment is a traditional static device without intelligent features.

Step 302: upon receiving the service failure alarm of the multiplex segment or the service failure alarm of the regenerative segment, the routing protocol unit confirms a service link failure in the control plane which is located in the same physical channel with the service link in the transport plane.

When the intelligent optical network based on the SDH/SONET uses an in-band control mode, the service link in the transport plane and the service link in the control plane are the same physical entity. Therefore, the service link failure in the transport pane is the service link failure in the control plane. When the intelligent optical network based on the SDH/SONET uses an out-band control mode, the link resources in the control plane may be an optical fiber link in the intelligent optical network and is not the same optical fiber link with the service link in the transport plane. Thus, the service failure alarm of the multiplex segment or the service failure alarm of the regenerative segment directly indicates a failure in the optical fiber link belonging to the control plane.

In this step, the alarm notification message for confirming a service link failure in the control plane is the service failure alarm of the multiplex segment or the service failure alarm of the regenerative segment, or may be other alarm messages.

Step 303: the routing protocol unit calculates a routing table in the control plane, and updates a routing forward table to enable all intelligent protocol messages in the control plane to reach destination nodes in time.

In this embodiment, the service link failure in the control plane is confirmed through the failure of the physical entity to which the service link in the control plane belongs. The method of this embodiment is applicable to the intelligent optical network which is based on the SDH/SONET and uses the in-band control mode or out-band control mode.

Figure 4:
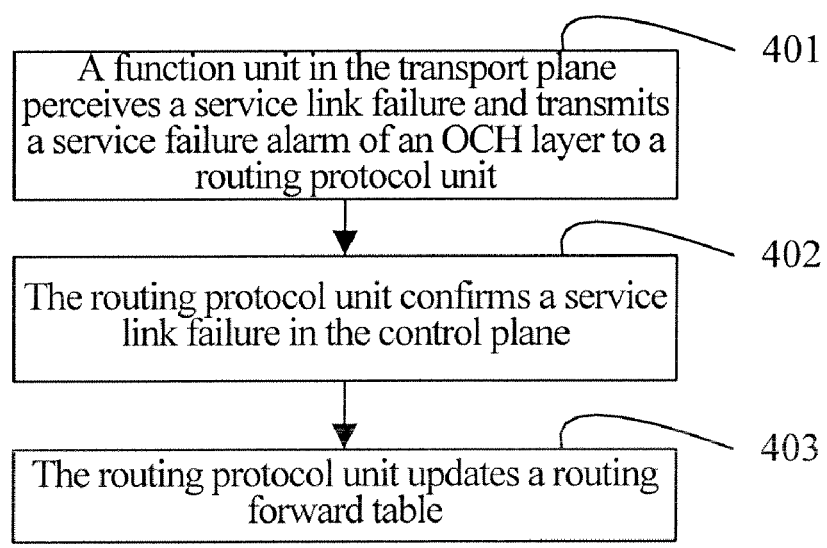
FIG. 4 is a simplified flow chart illustrating a method of routing convergence in the control plane according to another embodiment of the invention.

In another embodiment of the invention, the method of routing convergence in the control plane in this embodiment is implemented by the intelligent optical network based on a Wavelength Division Multiplexing (WDM) network. FIG. 4 is a simplified flow chart illustrating a method of routing convergence in the control plane according to this embodiment. As shown in FIG. 4, the method includes the following steps.

Step 401: a function unit in an Optical CHannel (OCH) layer of the transport plane transmits a service failure alarm to a routing protocol unit after perceiving a service link failure in the transport plane. The function unit in this embodiment is a traditional static device without intelligent features.

Step 402: upon receiving the service failure alarm of the OCH layer, the routing protocol unit confirms a service link failure in the control plane which is located in the same physical channel with the service link in the transport plane.

When the intelligent optical network based on the WDM network uses an in-band control mode, the service link in the transport plane and the service link in the control plane are the same physical entity. Therefore, the service link failure in the transport plane is the service link failure in the control plane. When the intelligent optical network based on the WDM network uses an out-band control mode, the link resources in the control plane may be an optical fiber link in the intelligent optical network and is not the same optical fiber link with the service link in the transport plane. Thus, the service failure alarm of the OCH layer directly indicates a failure in the optical link belonging to the control plane.

In this step, the alarm notification message for confirming a service link failure in the control plane is the service failure alarm of the OCH layer, or may be other alarm messages.

Step 403: the routing protocol unit calculates a routing table in the control plane, and updates a routing forward table to enable all intelligent protocol messages of control plane to reach destination nodes in time.

In this embodiment, the service link failure in the control plane is confirmed through the failure of the physical entity to which the service link in the control plane belongs. The method of this embodiment is applicable to the intelligent optical network which is based on the WDM network and uses the in-band control mode or out-band control mode.

Figure 5:
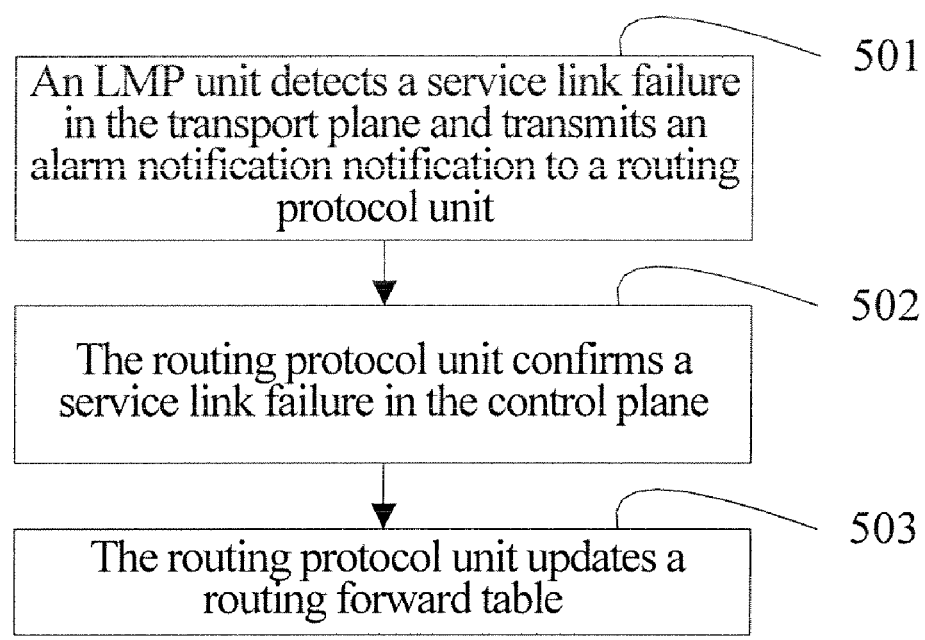
FIG. 5 is a simplified flow chart illustrating a method of routing convergence in the control plane according to another embodiment of the invention.
Figure 6:
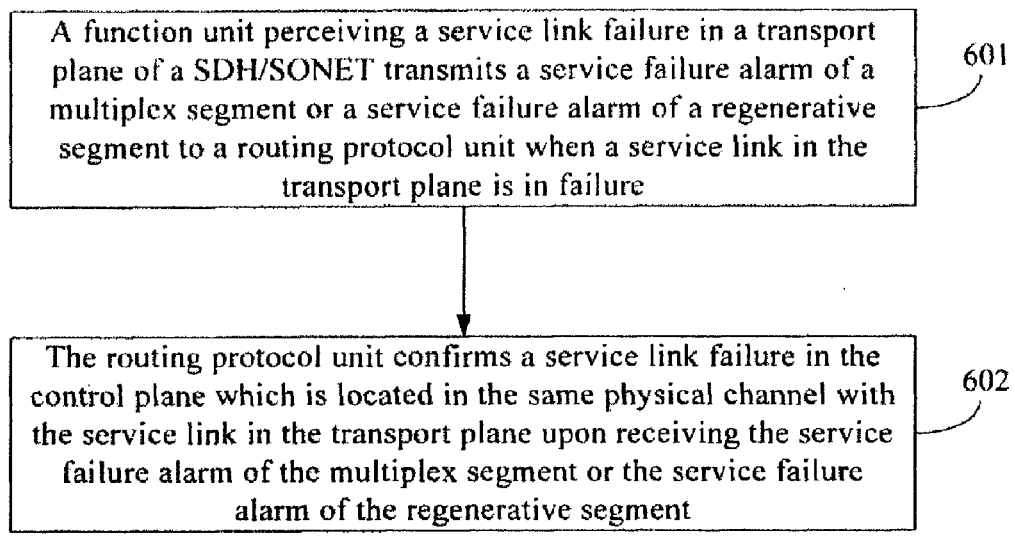
FIG. 6 is a simplified flow chart illustrating a method of routing convergence in a control plane according to another embodiment of the present invention.
Figure 7:
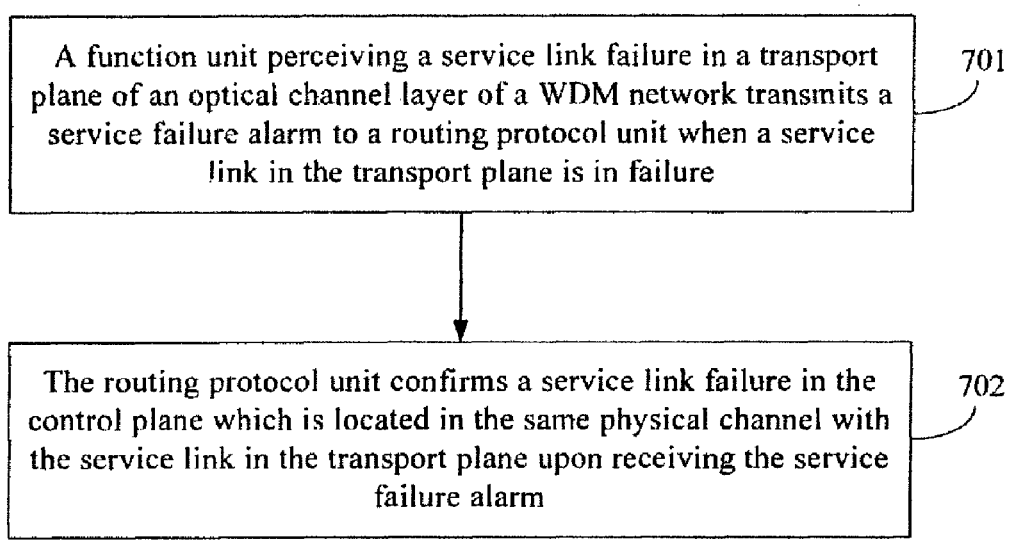
FIG. 7 is a simplified flow chart illustrating a method of routing convergence in a control plane according to another embodiment of the present invention.
Figure 8:
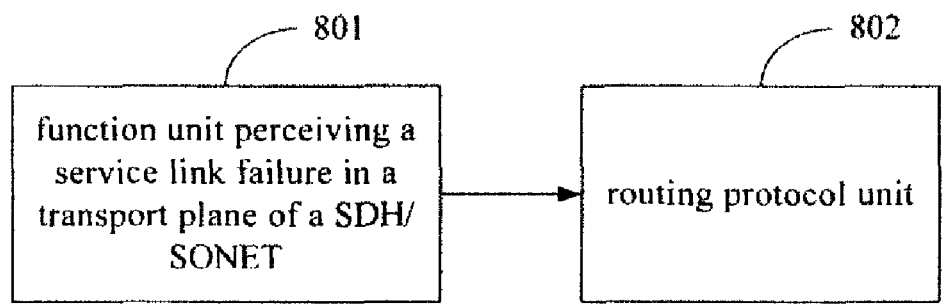
FIG. 8 is a simplified schematic diagram illustrating an intelligent optical network for implementing routing convergence in a control plane according to an embodiment of the present invention.
Figure 9:
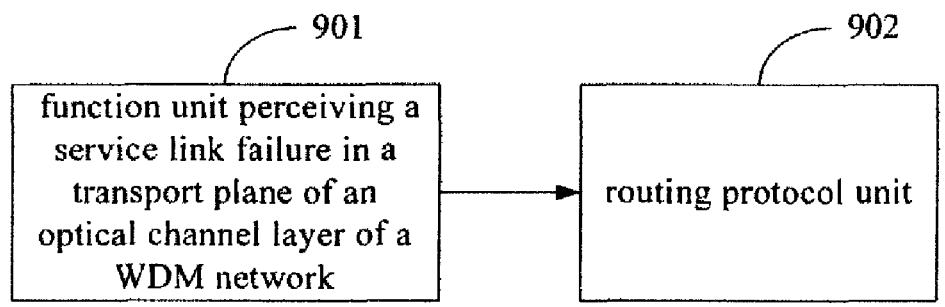
FIG. 9 is a simplified schematic diagram illustrating an intelligent optical network for implementing routing convergence in a control plane according to another embodiment of the present invention.

FIG. 5 is a simplified schematic flow chart illustrating a method of routing convergence in the control plane according to another embodiment of the invention. As shown in FIG. 5, the method includes the following steps.

Step 501: a Link Management Protocol (LMP) unit detects a service link failure in the transport plane and transmits an alarm notification message of the service link failure in the control plane to a routing protocol unit.

Step 502: upon receiving the alarm notification message of the service link failure in the control plane, the routing protocol unit confirms a service link failure in the control plane.

The LMP protocol unit may perceive the failure of a control channel in a short time. The routing protocol unit may get the service link failure in the control plane after receiving the alarm notification message.

Step 503: the routing protocol unit calculates a routing table in the control plane, and updates a routing forward table to enable all intelligent protocol messages of control plane to reach destination nodes in time.

This embodiment is applicable to all intelligent optical networks. According to this embodiment, it is possible to quickly determine the state change of the service link in the control plane under the circumstance that the service link in the transport plane is normal but a service link in the control plane is in failure.

The foregoing descriptions are only preferred embodiments of the invention and are not for use in limiting the protection scope thereof. Any modification, equivalent replacement or improvement made under the spirit and principles of the invention is included in the protection scope of the claims of the invention.

What is claimed is:

1. A method of routing convergence in a control plane of an intelligent optical network, comprising:
    transmitting, by a function unit perceiving a service link failure in a transport plane of a Synchronous Digital Hierarchy/Synchronous Optical Network (SDH/SONET), a service failure alarm of a multiplex segment or a service failure alarm of a regenerative segment to a routing protocol unit when a service link in the transport plane is in failure; and
    confirming, by the routing protocol unit, a service link failure in the control plane which is located in the same physical channel with the service link in the transport plane upon receiving the service failure alarm of the multiplex segment or the service failure alarm of the regenerative segment.

2. The method of claim 1, wherein the function unit is a traditional static device without intelligent features.

3. The method of claim 1, further comprising:
    calculating, by the routing protocol unit, a routing table of the control plane, and updating a routing forward table according to the calculated result.

4. A method of routing convergence in a control plane of an intelligent optical network, comprising:
    transmitting, by a function unit perceiving a service link failure in a transport plane of an optical channel layer of a Wavelength Division Multiplexing (WDM) network, a service failure alarm to a routing protocol unit when a service link in the transport plane is in failure; and
    confirming, by the routing protocol unit, a service link failure in the control plane which is located in the same physical channel with the service link in the transport plane upon receiving the service failure alarm.

5. The method of claim 4, wherein the function unit is a traditional static device without intelligent features.

6. The method of claim 4, further comprising:
    calculating, by the routing protocol unit, a routing table of the control plane, and updating a routing forward table according to the calculated result.

7. An intelligent optical network for implementing routing convergence in a control plane of the intelligent optical network, comprising a function unit perceiving a service link failure in a transport plane of a Synchronous Digital Hierarchy/Synchronous Optical Network (SDH/SONET) and a routing protocol unit,
    wherein the function unit is a traditional static device without intelligent features,
    wherein the function unit perceiving a service link failure is adapted to transmit a service failure alarm of a multiplex segment or a service failure alarm of a regenerative segment to the routing protocol unit when a service link in the transport is in failure, and
    wherein the routing protocol unit is adapted to confirm a service link failure in the control plane which is located in the same physical channel with the service link in the transport plane upon receiving the service failure alarm of the multiplex segment or the service failure alarm of the regenerative segment.

8. The intelligent optical network of claim 7, wherein the routing protocol unit calculates a routing table of the control plane and updates a routing forward table according to the calculated result.

9. An intelligent optical network for implementing routing convergence in a control plane of the intelligent optical network, comprising:
    a function unit perceiving a service link failure in a transport plane of an optical channel layer of a Wavelength Division Multiplexing (WDM) network and a routing protocol unit,
    wherein the function unit is a traditional static device without intelligent features,
    wherein the function unit perceiving a service link failure is adapted to transmit a service failure alarm to the routing protocol unit when a service link in the transport plane is in failure, and
    wherein the routing protocol unit is adapted to confirm a service link failure in the control plane which is located in the same physical channel with the service link in the transport plane upon receiving the service failure alarm.

10. The intelligent optical network of claim 9, wherein the routing protocol unit calculates a routing table of the control plane and updates a routing forward table according to the calculated result.

* * * * *

UNITED STATES PATENT AND TRADEMARK OFFICE
CERTIFICATE OF CORRECTION

PATENT NO.        : 8,139,936 B2
APPLICATION NO.   : 11/697136
DATED             : March 20, 2012
INVENTOR(S)       : Junbai Sun et al.

It is certified that error appears in the above-identified patent and that said Letters Patent is hereby corrected as shown below:

Column 6 Line 16 "comprising a" should read "comprising:"

Signed and Sealed this
Fifth Day of June, 2012

David J. Kappos
*Director of the United States Patent and Trademark Office*